Patented Feb. 20, 1945

2,369,956

UNITED STATES PATENT OFFICE 2,369,956

SYNTHESIS OF MULTILINK HYDROCARBONS FROM HYDROGEN AND CARBON MONOXIDE

Walter Feisst, Otto Roelen, and Walter Schuff, Oberhausen-Holten, Germany; vested in the Alien Property Custodian No Drawing. Application October 14, 1941, Serial No. 414,926. In Germany October 6, 1936

9 Claims. (Cl. 260—449.6)

This invention relates to the Fischer-Tropsch process of synthesis of multi-link hydrocarbons from hydrogen and carbon monoxide in the presence of a suitable catalyst, and more particularly to a process of regenerating the catalyst employed in the Fischer-Tropsch synthesis.

This application is a continuation of U. S. Serial No. 163,352, filed September 11, 1937, and claiming the priority dates of September 22 and October 6, 1936.

It is an object of this invention to provide a process whereby to regenerate the catalyst which has been employed in the Fischer-Tropsch process and the activity of which has been exhausted after extended use in such process, in a more lasting and more facile manner than was heretofore possible.

Other objects and the manner in which the same are attained, will appear from the following description.

As is well known, the Fischer-Tropsch process of synthesis of multi-link hydrocarbons from hydrogen and carbon monoxide, requires the presence of a catalyst, this catalytic material relying for its catalytic activity on the presence of iron, nickel or cobalt or mixtures of these metals. Apart from these metals, the catalyst usually contains activating additions of alkalis, alkaline earth, magnesium, rare earth, thorium, copper or manganese. The catalytically active metals and their activating additions may be precipitated on carrier substances such as kieselguhr or the like.

When such catalyst has been used in the Fischer-Tropsch process over a certain length of time, its efficiency begins to drop. This reduction in activity is mainly due to the fact that high-molecular organic substances produced in the process are deposited on the catalyst. Over a certain period, the catalytic activity of such catalysts may be restored by methods of treatment whereby the high-molecular organic deposits are removed from the catalyst. Thus, for example, the weakened catalyst may be treated at synthesis temperature with hydrogen or a suitable liquid. While such measures for the regeneration of the catalyst may be frequently repeated, it has been found that in the end the high-molecular organic substances adhere so tenaciously to the catalysts that more drastic measures are to be employed, these measures including dissolution of the contact substance and subsequent restoration by re-precipitation of the catalytic metals. This procedure, however, was found to be accompanied by the disadvantage that the deposits remaining in the contact substance materially increase the difficulty of restoring the catalyst. Thus, for example, the filtration of the metal salt solution produced by decomposition with acid is rendered more difficult by the presence of high-molecular paraffins contained in the spent catalyst. Moreover, the re-precipitation of the catalytic metals is affected by the fatty acids and other oxygen containing compounds which are produced from the paraffins on the dissolution of the catalysts in nitric acid, the compounds referred to preventing precipitation by the formation of complexes. In view of these drawbacks, the prior art lacked any satisfactory method of completely regenerating the catalyst once the treatments at synthesis temperature of the partly weakened catalyst were no longer of any avail.

According to the present invention, the afore-noted drawbacks are eliminated, and a very satisfactory procedure of regenerating the completely spent catalyst is arrived at in the following manner. Prior to the dissolution in acid, the spent catalyst is subjected to a preliminary treatment wherein hydrogen is passed over the spent catalyst at a temperature materially in excess of the synthesis temperature. While the main requirement is that the temperature of the preliminary treatment should be materially in excess of the synthesis temperature, a temperature above 300° C. is generally indicated. Preferably this temperature should even exceed 350° C., a preferred range for the temperatures useful in carrying out this preliminary treatment with hydrogen being between about 350° C. and about 400° C. We have found that this preliminary treatment completely removes the organic substances from the catalysts, and it is by virtue of this complete removal of the objectionable deposit that after the preliminary treatment has come to an end the catalytic material may be dissolved in a acid and the catalytically active metals may be re-precipitated without the occurrence of any such detrimental effects as were enumerated above.

In the preliminary treatment with hydrogen, if it is desired to recover by itself the high-melting hard paraffin that may be separated from the spent catalysts, it is advisable to extract the catalysts with a suitable solvent or a suitable scouring agent prior to carrying out the preliminary treatment with hydrogen. Preferably this extraction step should proceed at temperatures which exceed the melting points of the hard paraffins. This extraction of the spent catalysts not only results in the recovery of the high-melting point paraffin, but moreover has the added advantage that when the extraction is followed immediately by the preliminary treatment with hydrogen, there results a substantial saving of this gas.

The time required for removing the organic deposits from the catalysts depends upon the temperatures employed and the velocity at which hydrogen is passed over the catalytic material. Increases of this velocity and increases of these temperatures tend to shorten the time period required for the preliminary treatment of the catalysts. Thus it was found that the deposited organic substances could be completely removed from the contact substance within half an hour by passing the hydrogen thereover at temperatures from 350° to 400° C. and at a velocity of from 50 to 60 1 per hour per sq. cm. This time period, however, may be further reduced by additional increases in the velocity and the temperature of the treatment.

If it is desired to eliminate the pyrophoric properties of the contact substance so that it may be brought into contact with the atmosphere without any danger of spontaneous combustion, a certain amount of steam may be added to the hydrogen employed in the preliminary treatment of the contact substance, or else the preliminary treatment with hydrogen may be followed by a subsequent treatment with steam, the oxidizing action of the steam removing in both instances the pyrophoric properties of the contact substance.

Example

A cobalt catalyst of the type conventionally employed in the Fischer-Tropsch process of synthesis of multi-link hydrocarbons from hydrogen and carbon monoxide, which had been reactivated a great many times in the synthesis furnace by treatment with hydrogen at synthesis temperature until its activity had finally totally departed, is treated with a rapidly flowing stream of hydrogen at 350° C. After the lapse of two hours the catalytic mass has lost about 40% of its weight, paraffin and other organic substances having been withdrawn from the catalyst with the hydrogen, 80 to 85% of organic substances removed from the catalyst in the form of a paraffin with a melting point of from 60 to 65° C. being obtained. The catalytic mass which under the hydrogen treatment has lost practically all organic substances previously deposited thereon, after cooling, is moistened with water and dissolved in nitric acid. The catalytically active metals are precipitated by means of a soda solution from the metal salt solution thus obtained, after purification by filtration. The washed and dried catalyst is then reduced with hydrogen and now is again available for use in a Fischer-Tropsch synthesis.

We claim:

1. A process of regenerating catalysts which are commonly used in the synthesis of liquid hydrocarbons from carbon monoxide and hydrogen and which have been inactivated in said synthesis to such an extent that the known reactivation methods fail, comprising treating said inactivated catalysts with hydrogen at a temperature substantially above that at which they have been used in the synthesis, dissolving the catalytically active components in acids and again precipitating same.

2. A process of regenerating catalysts which are commonly used in the synthesis of liquid hydrocarbons from carbon monoxide and hydrogen and which have been inactivated in said synthesis to such an extent that the known reactivation methods fail, comprising treating said inactivated catalysts with hydrogen at a temperature above 300° C., dissolving the catalytically active components in acids and again precipitating same.

3. A process of regenerating catalysts which are commonly used in the synthesis of liquid hydrocarbons from carbon monoxide and hydrogen and which have been inactivated in said synthesis to such an extent that the known reactivation methods fail, comprising treating said inactivated catalysts with hydrogen at a temperature above 350° C., dissolving the catalytically active components in acids and again precipitating same.

4. A process of regenerating catalysts which are commonly used in the synthesis of liquid hydrocarbons from carbon monoxide and hydrogen and which have been inactivated in said synthesis to such an extent that the known reactivation methods fail, comprising treating said inactivated catalysts with hydrogen at a temperature between 350 and 400° C., dissolving the catalytically active components in acids and again precipitating same.

5. A process of regenerating catalysts which are commonly used in the synthesis of liquid hydrocarbons from carbon monoxide and hydrogen and which have been inactivated in said synthesis to such an extent that the known reactivation methods fail, comprising treating said inactivated catalysts with hydrogen and steam at a temperature above 300° C., dissolving the catalytically active components in acids and again precipitating same.

6. A process of regenerating catalysts which are commonly used in the synthesis of liquid hydrocarbons from carbon monoxide and hydrogen and which have been inactivated in said synthesis to such an extent that the known reactivation methods fail, comprising treating said inactivated catalysts with hydrogen and steam at a temperature above 350° C., dissolving the catalytically active components in acids and again precipitating same.

7. A process of regenerating catalysts which are commonly used in the synthesis of liquid hydrocarbons from carbon monoxide and hydrogen and which have been inactivated in said synthesis to such an extent that the known reactivation methods fail, comprising treating said inactivated catalysts with hydrogen at a temperature above 300° C., dissolving the catalytically active components in acids, again precipitating said components, washing and drying the precipitate and reducing it with hydrogen.

8. A process of regenerating catalysts which are commonly used in the synthesis of liquid hydrocarbons from carbon monoxide and hydrogen and which have been inactivated in said synthesis to such an extent that the known reactivation methods fail, comprising treating said inactivated catalysts with hydrogen and steam at a temperature substantially above the temperature at which they have been used in the synthesis, dissolving the catalytically active components in acids and again precipitating said components, washing and drying the precipitate and reducing it with hydrogen.

9. A process of regenerating catalysts which are commonly used in the synthesis of liquid hydrocarbons from carbon monoxide and hydrogen and which have been inactivated in said synthesis to such an extent that the known reactivation methods fail, comprising treating said inactivated catalysts with hydrogen and steam at a temperature above 300° C., then dissolving the catalytically active components in acids, again precipitating said components, washing and drying the precipitate and reducing it with hydrogen.

WALTER FEISST.
OTTO ROELEN.
WALTER SCHUFF.

Certificate of Correction

Patent No. 2,369,956.  February 20, 1945.

WALTER FEISST ET AL.

It is hereby certified that error appears in the printed specification of the above numbered patent requiring correction as follows: Page 2, first column, line 48, after the word and period "synthesis." insert the following paragraph:

*Various changes within the scope of the appended claims may be made in the details of the foregoing specification without departing from the spirit of the invention or sacrificing any of the advantages thereof.* and that the said Letters Patent should be read with this correction therein that the same may conform to the record of the case in the Patent Office.

Signed and sealed this 13th day of August, A. D. 1946.

[SEAL]

LESLIE FRAZER,
*First Assistant Commissioner of Patents.*